United States Patent
Choi

(10) Patent No.: US 8,302,576 B2
(45) Date of Patent: Nov. 6, 2012

(54) VARIABLE INTAKE SYSTEM

(75) Inventor: Jaeseok Choi, Anyang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 811 days.

(21) Appl. No.: 12/487,440

(22) Filed: Jun. 18, 2009

(65) Prior Publication Data

US 2010/0114456 A1    May 6, 2010

(30) Foreign Application Priority Data

Nov. 6, 2008    (KR) .................... 10-2008-0109852

(51) Int. Cl.
    *F02M 35/10*    (2006.01)
(52) U.S. Cl. ......... 123/184.49; 123/184.51; 123/184.53; 123/184.55; 123/184.57
(58) Field of Classification Search ............. 123/184.47, 123/184.48, 184.49, 184.51, 184.53, 184.55, 123/184.56, 184.57
    See application file for complete search history.

(56) References Cited

U.S. PATENT DOCUMENTS

| | | | | |
|---|---|---|---|---|
| 4,726,329 A * | 2/1988 | Atkin | ................ | 123/184.34 |
| 5,638,785 A * | 6/1997 | Lee | ................ | 123/184.35 |
| 5,813,380 A * | 9/1998 | Takahashi et al. | ....... | 123/184.55 |
| 5,967,107 A * | 10/1999 | Karlsson et al. | ......... | 123/184.55 |
| 6,302,076 B1 * | 10/2001 | Bredy | ................ | 123/184.21 |
| 7,370,622 B2 * | 5/2008 | Bloomer et al. | ......... | 123/184.55 |
| 2003/0111036 A1 * | 6/2003 | Nomura et al. | .......... | 123/184.53 |
| 2005/0188940 A1 * | 9/2005 | Huff | ................ | 123/184.42 |
| 2005/0279312 A1 * | 12/2005 | Park | ................ | 123/184.53 |
| 2005/0279313 A1 * | 12/2005 | Boyes | ................ | 123/184.55 |
| 2006/0016415 A1 * | 1/2006 | Sasaki et al. | ............. | 123/184.55 |
| 2006/0150939 A1 * | 7/2006 | Kobori | ................ | 123/184.55 |
| 2007/0234993 A1 * | 10/2007 | Bloomer et al. | ......... | 123/184.47 |
| 2007/0240666 A1 * | 10/2007 | Osakabe et al. | ......... | 123/184.34 |
| 2009/0272355 A1 * | 11/2009 | Nogawa | ................ | 123/184.55 |
| 2011/0005487 A1 * | 1/2011 | Bong et al. | ............... | 123/184.42 |

FOREIGN PATENT DOCUMENTS

JP    2006-37766 A    2/2006

* cited by examiner

*Primary Examiner* — Thomas Moulis
(74) *Attorney, Agent, or Firm* — Morgan, Lewis & Bockius LLP

(57) ABSTRACT

A variable intake system may include a single plenum that is connected to runners and that has a space formed therein, a first barrier that divides the space inside the plenum into a first space and a second space, a first variable valve that is mounted on the first barrier to connect or isolate the first space and the second space to/from each other, a variable pipe of which one side thereof is connected to the plenum and the other side is closed, a second barrier that divides the variable pipe into at least two spaces, and a second variable valve that is mounted on the second barrier to connect or isolate the at least two spaces to/from each other to improve intake efficiency.

11 Claims, 7 Drawing Sheets

VARIABLE INTAKE SYSTEM

CROSS-REFERENCE TO RELATED APPLICATION

The present application claims priority to Korean Patent Application Number 10-2008-0109852 filed Nov. 6, 2008, the entire contents of which application is incorporated herein for all purposes by this reference.

BACKGROUND OF THE INVENTION

1. Field of the Invention

The present invention relates to a variable intake system, and more particularly to a variable intake system in which a variable pipe is formed in a plenum of an intake manifold to improve intake efficiency.

2. Description of Related Art

Generally, an intake manifold guides intake air to combustion chambers and uniformly distributes a mixture of air and fuel to a plurality of combustion chambers.

The intake manifold includes a plurality of runners that are connected to intake ports and a plenum that is disposed to be connected to the runners, and efficiency of an engine is varied according to the capacity of the plenum.

In order to improve the efficiency of the intake manifold a variable pipe is further formed on the plenum, however it is difficult to secure appropriate length and cross-section of the variable pipe according to the layout of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a variable intake system having advantages of variably improving intake efficiency and securing the length and the cross-section of a variable pipe according to the layout of an engine by changing the structure of the variable pipe.

In an aspect of the present invention, the variable intake system may include a single plenum that is connected to runners and that has a space formed therein, a first barrier that divides the space inside the plenum into a first space and a second space, a first variable valve that is mounted on the first barrier to connect or isolate the first space and the second space to/from each other, a variable pipe of which one side thereof is connected to the plenum and the other side is closed, a second barrier that divides the variable pipe into at least two spaces, and a second variable valve that is mounted on the second barrier to connect or isolate the at least two spaces to/from each other.

The first barrier and the second barrier may be connected to each other.

The second variable valve may be disposed in an end portion that is a closed part of the variable pipe, the second barrier of the variable pipe is disposed in a length direction of the variable pipe, and the at least two spaces of the variable pipe are disposed in a vertical (or up/down) direction.

The first variable valve or the second variable valve may be variably opened or closed according to engine rotation speed or the opening amount of a throttle valve.

The runners may include at least a first runner that is connected to a first bank of an engine and at least a second runner that is connected to a second bank of the engine.

In another aspect of the present invention, a control method of a variable intake system including a single plenum that is connected to runners and that has a space formed therein, a first barrier that divides the plenum into a first space and a second space, a first variable valve that is mounted on the first barrier to connect or isolate the first space and the second space to/from each other, a variable pipe of which one side thereof is connected to the plenum and the other side is closed, a second barrier that divides the variable pipe into at least two spaces, and a second variable valve that is mounted on the second barrier to connect or isolate the at least two spaces to/from each other, may include, detecting rotation speed of an engine, detecting an opening amount of a throttle valve, and controlling an opening amount of the second variable valve according to the rotation speed of the engine and/or the opening amount of the throttle valve.

The control method of a variable intake system may further include controlling the opening amount of the first variable valve according to the rotation speed of the engine and/or the opening amount of the throttle valve.

The control method of a variable intake system may further include closing the first variable valve and the second variable valve at a first predetermined engine speed and opening the first variable valve and the second variable valve at a second predetermined engine speed, wherein the first predetermined engine speed is lower than the second predetermined engine speed.

The control method of a variable intake system may further include opening the first and second variable valves in a case in which the rotation speed of the engine is larger than or equal to a first predetermined value and the opening amount of the throttle valve is larger than or equal to a predetermined opening amount, closing the first variable valve and opening the second variable valve in a case in which the rotation speed of the engine is less than the first predetermined value and is larger than a second predetermined value, and closing the first and second variable valves in a case in which the rotation speed of the engine is less than the second predetermined value and is larger than or equal to a third predetermined value.

The control method of a variable intake system may further include closing the first and second variable valves in a case in which the rotation speed of the engine is less than a third predetermined value.

The control method of a variable intake system may further include comprising opening the first and second variable valves in a case in which the opening amount of the throttle valve is less than the predetermined opening amount.

As stated above, in the variable intake system according to the present invention, the variable pipe efficiently absorbs a pressure wave generated in the plenum to improve intake efficiency.

Further, the pressure wave inside the plenum is efficiently absorbed according to the closing state and the opening state of the variable valve that is mounted on the barrier.

In addition, the variable pipe is divided into upper and lower portions and therefore it is possible to dispose the variable pipe in a narrow space.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
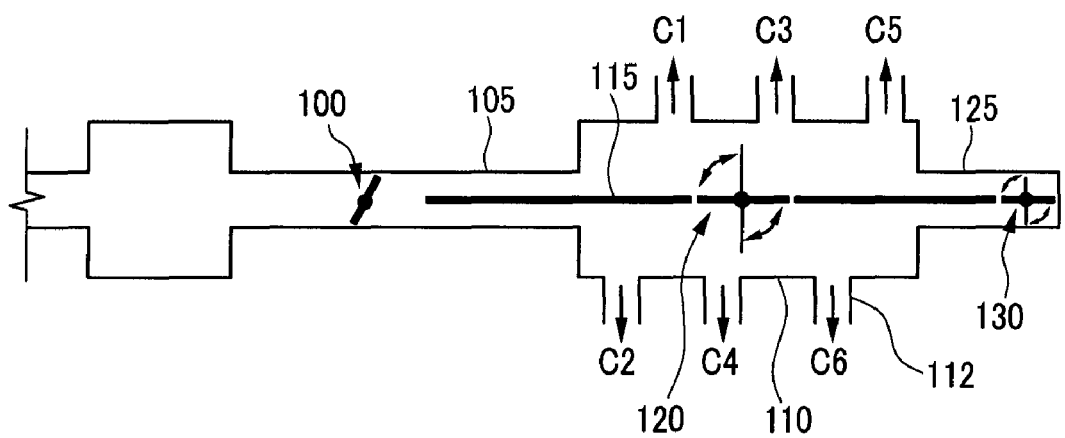
FIG. 1 is a schematic diagram of an exemplary variable intake system according to the present invention.

FIG. 1 is a schematic diagram of an exemplary variable intake system according to the present invention.

Referring to FIG. 1, a variable intake system includes runners 112 that are connected to intake ports, a plenum 110 that is connected to the runners 112, a zip tube 105 that supplies the plenum 110 with external air, and a throttle valve 100 that is mounted on the front portion of the zip tube 105.

Also, a variable pipe 125 is further disposed in one side of the plenum 110 in the variable intake system, and one end portion of the variable pipe 125 communicates with the plenum 110 and the other end portion has a closed structure.

A barrier 115 is disposed in the zip tube 105, the plenum 110, and the variable pipe 125, and the barrier divides the internal space thereof. Also, a first variable valve 120 and a second variable valve 130 are mounted on the barrier 115.

The first variable valve 120 is disposed inside the plenum and the second variable valve 130 is disposed inside the variable pipe 125. In this case, the first and second variable valves 120 and 130 are respectively opened or closed to improve intake efficiency according to the RPM of the engine or the opening amount of the throttle valve 100.

In various embodiments of the present invention, the runners 112 includes first runners that are connected to a first bank of the engine and second runners that are connected to a second bank of the engine, and it is desirable that the above structure is applied to V-type engine.

Figure 2:
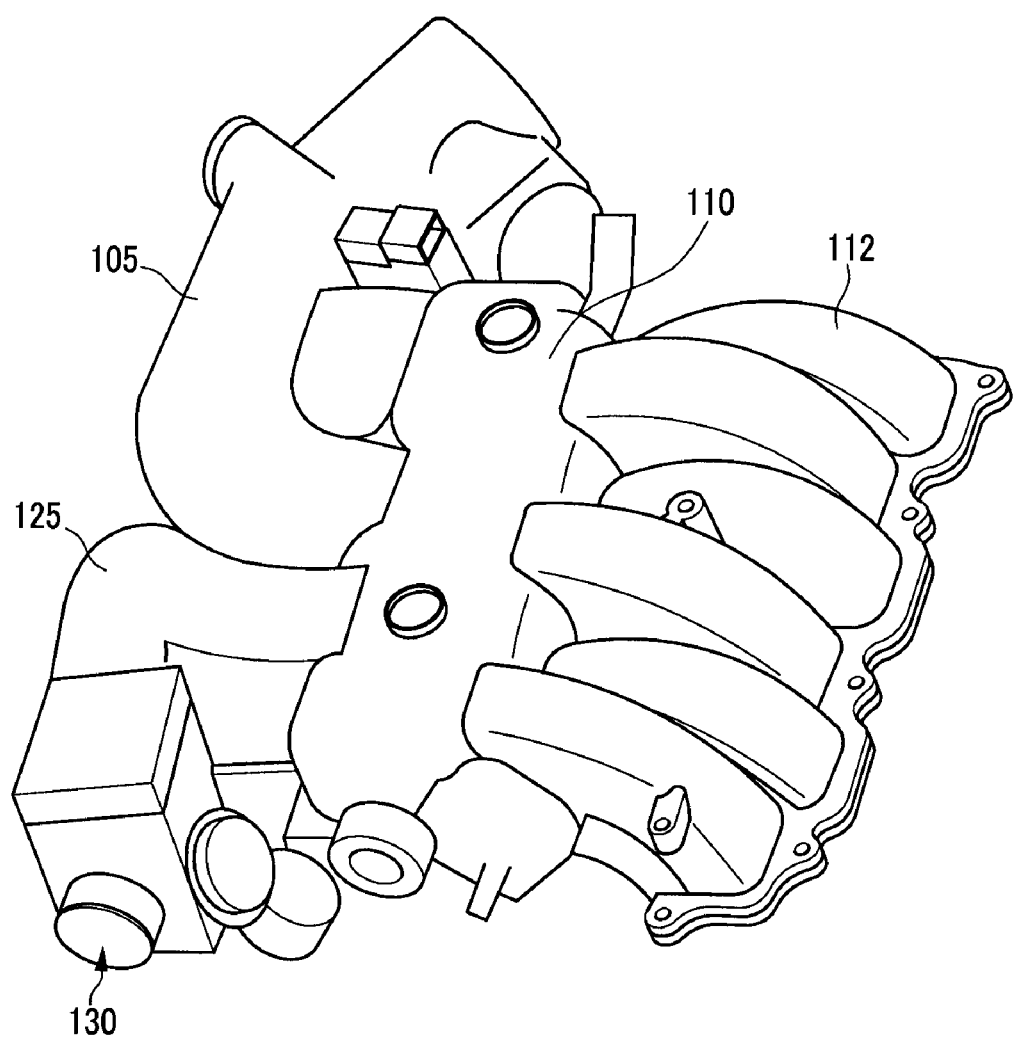
FIG. 2 is an external perspective view of an exemplary variable intake system according the present invention.

FIG. 2 is an external perspective view of an exemplary variable intake system according to the present invention.

Referring to FIG. 2, the variable intake system includes the runners 112, the plenum 110, the zip tube 105, the variable pipe 125, and the second variable valve 130.

Six runners 112 are sequentially disposed in a cylinder arrangement direction, and the plenum 110 is extended in a direction that the runners 112 are disposed.

The runners 112 are connected to one edge of the plenum 110, and the zip tube 105 and the variable pipe 125 are connected to the other edge of the plenum 110.

As shown in FIG. 2, the plenum 110 is disposed in one (left) side of the upper portion of the engine, and therefore it is easy to design the layout of the engine.

Figure 3:
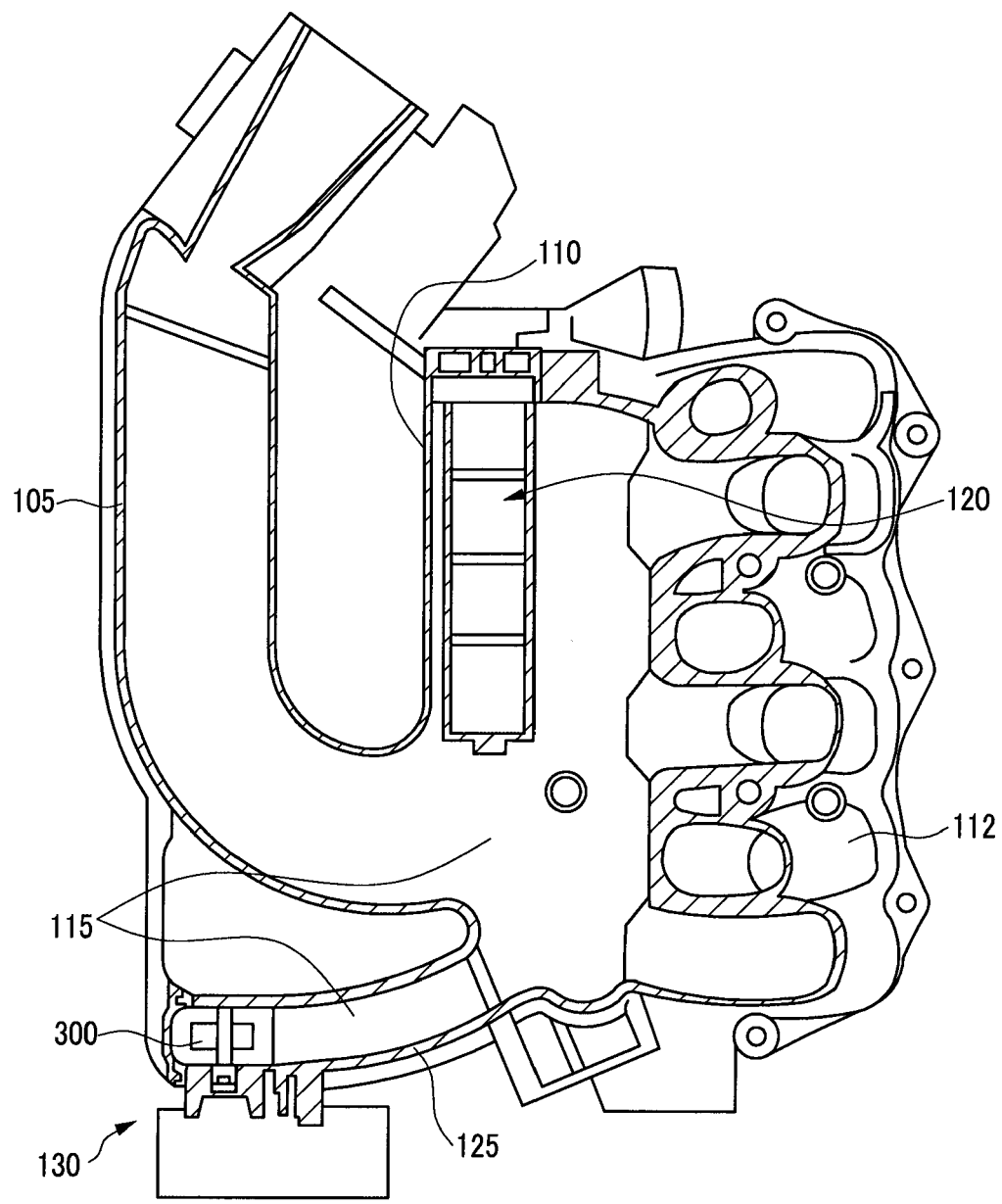
FIG. 3 is an internal top plan view of an exemplary variable intake system according to the present invention.
Figure 4:
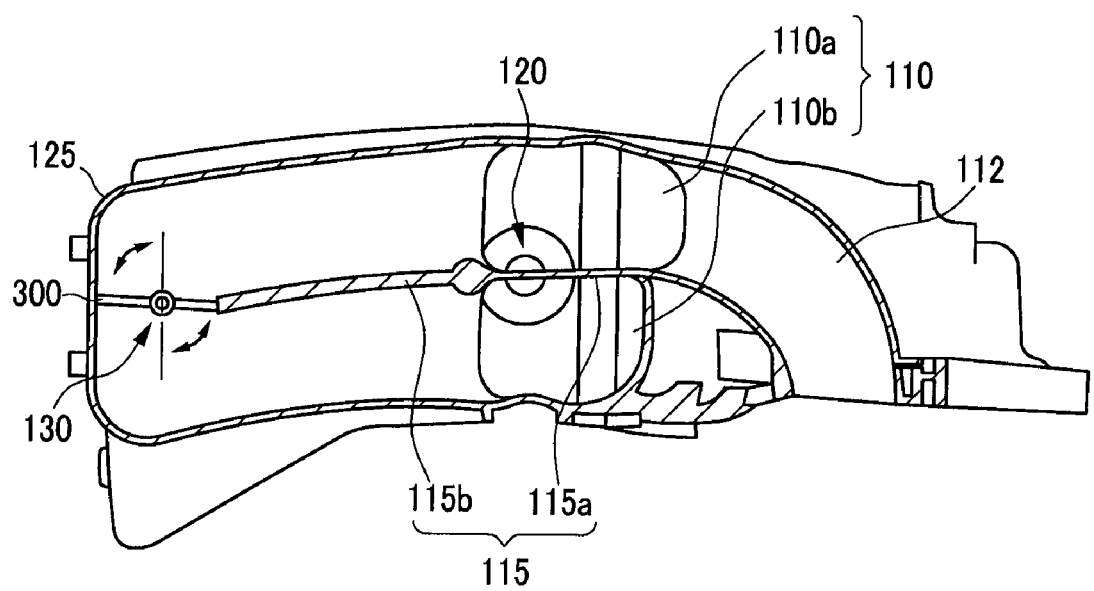
FIG. 4 is an internal side view of an exemplary variable intake system according to the present invention.

FIG. 3 is an internal top plan view of an exemplary variable intake system according to the present invention, and FIG. 4 is an internal side view of an exemplary variable intake system according to the present invention.

Referring to FIG. 3 and FIG. 4, a first barrier 115a divides the inside space of the plenum 110 into upper and lower spaces, and a second barrier 115b divides the inside space of the variable pipe 125 into upper and lower spaces. The first and second barriers 115 are connected with each other in various embodiments of the present invention.

Also, the first variable valve 120 is disposed in the first barrier 115a to be opened or closed, and the upper and lower spaces of the plenum 110 communicate with each other through the first variable valve 120.

Also, the second variable valve 130 is disposed on the second barrier 115b, and a valve vane 300 that is connected to the second variable valve 130 is operated by the second variable valve 130. Accordingly, the spaces that are divided in an upper/lower direction of the variable pipe 125 are opened or closed by the valve vane 300.

Referring to FIG. 4, the plenum 110 includes a right plenum 110a that is formed in an upper portion and a left plenum 110b that is formed in a lower portion thereof, and the left and right plenums 110a and 110b are connected or intercepted by the first variable valve 120.

The upper space of the variable pipe 125 is connected to the right plenum 110a and the lower space is connected to left plenum 110b. Also, the second barrier 115b that is mounted in the variable pipe 125 is formed in a length direction of the variable pipe 125, and the second variable valve 130 is formed in an end portion of the second barrier 115b.

Referring to FIG. 4, the variable pipe 125 absorbs a pressure wave of the plenum that is generated during an intake stroke to improve intake efficiency.

Figure 5:
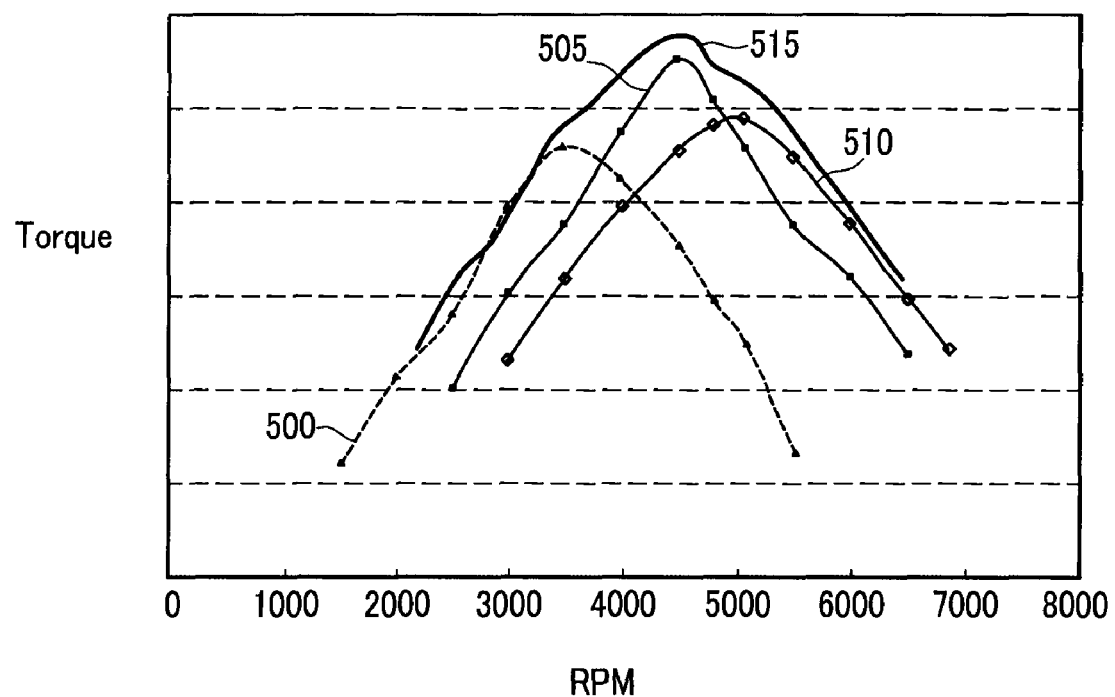
FIG. 5 is a graph showing the performance of an exemplary engine that is equipped with an exemplary variable intake system according to the present invention.

FIG. 5 is a graph showing the performance of an engine that is equipped with an exemplary variable intake system according to the present invention.

Referring to FIG. 5, the horizontal axis designates RPM of the engine and the vertical axis designates torque that is output by the engine. Also, a first line 500, a second line 505, a third line 510, and a fourth line 515 respectively shows the relationship of the torque and the RPM according to the operating condition of the engine.

The first line 500 shows the torque of the engine in a state in which both the first and second variable valves 120 and 130 are closed, and the second line 505 shows the torque of the engine in a state in which the first variable valve 120 is closed and the second variable valve 130 is opened.

The third line 510 shows the state in which the first and second variable valves 120 and 130 are opened. Further, the fourth line 515 shows the state in which the first and second variable valves 120 and 130 are variably controlled according to the RPM of the engine.

As shown in FIG. 5, when the first and second variable valves 120 and 130 are variably controlled according to the RPM of the engine, the torque of the engine is raised overall.

Figure 6:
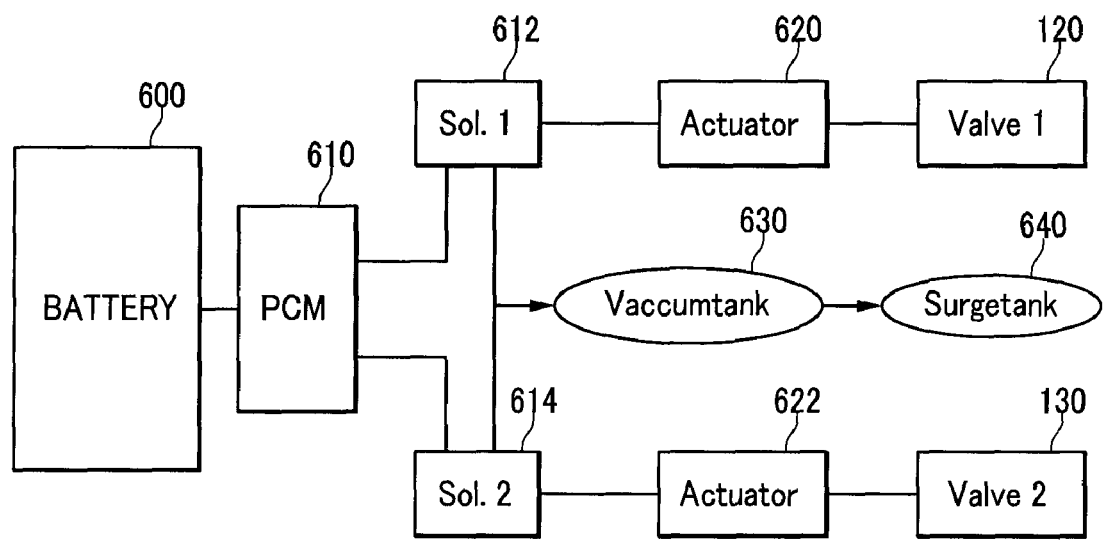
FIG. 6 is a schematic diagram showing constituent elements of an exemplary variable intake system according to the present invention.

FIG. 6 is a schematic diagram showing constituent elements of an exemplary variable intake system according to the present invention.

Referring to FIG. 6, the variable intake system includes a battery 600, a PCM 610, first and second solenoid valves 612 and 614, first and second actuators 620 and 622, the first and second variable valves 120 and 130, a vacuum tank 630, and a surge tank 640.

The PCM 610 receives electric power from the battery 600 and supplies operating signals to the first and second solenoid valves 612 and 614, and the first and second solenoid valves 612 and 614 use air pressure of the vacuum tank 630 and the surge tank 640 to control the first and second variable valves 120 and 130 through the first and second actuators 620 and 622.

Figure 7:
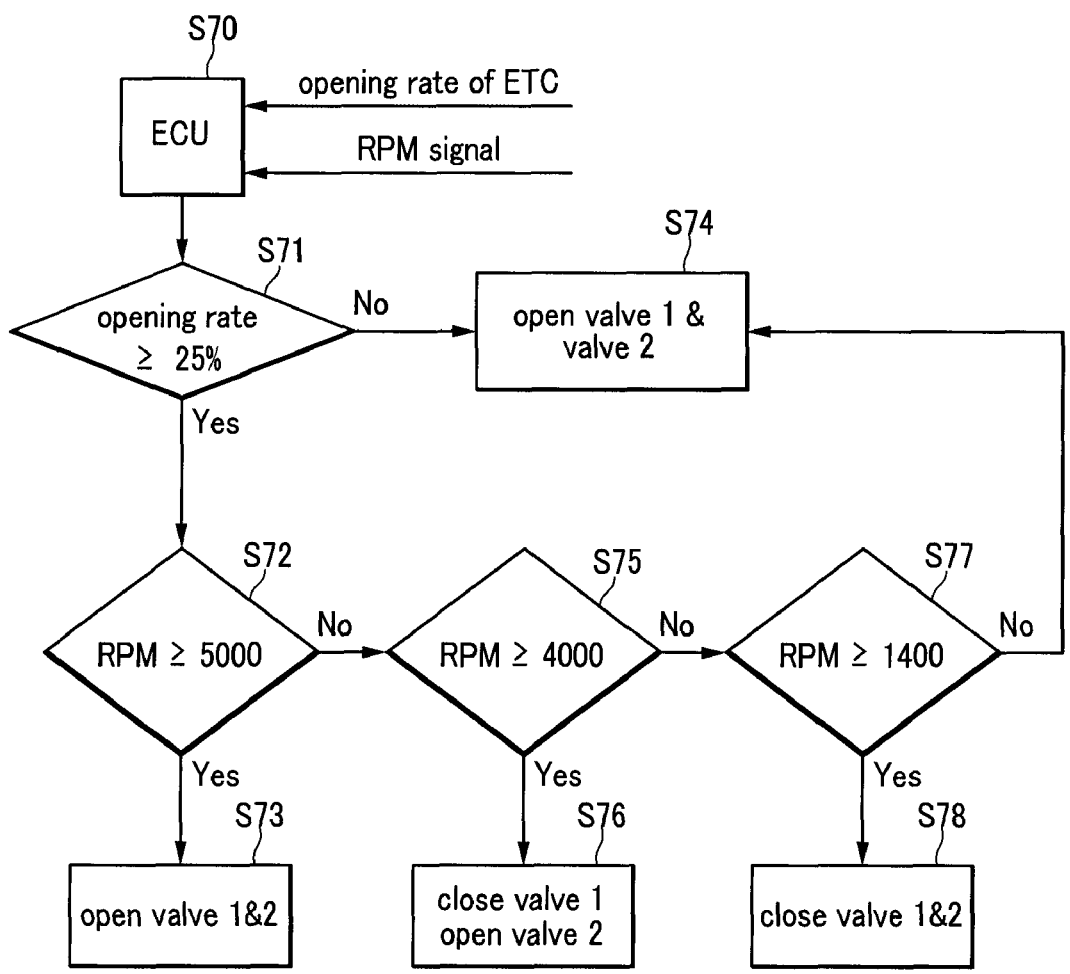
FIG. 7 is a control flowchart of an exemplary variable intake system according to the present invention.

FIG. 7 is a control flowchart of an exemplary variable intake system according to the present invention.

Referring to FIG. 7, an electronic control unit (ECU) detects the opening amount of the throttle valve 100 and the RPM of the engine in a starting step S70.

In a first step S71, it is determined whether the opening amount of the throttle valve 100 is higher than 25%. When the opening amount of the throttle valve 100 is higher than 25%, it is determined whether the RPM of the engine is higher than a predetermined value of 5000 in a second step S72.

When the RPM of the engine is higher than the predetermined value of 5000 in the second step S72, the first and second variable valves 120 and 130 are opened in a third step S73.

In a case in which the opening amount of the throttle valve 100 is less than 25% in the first step S71, both the first and second variable valves 120 and 130 are opened in the fourth step S74. Also, when the RPM of the engine is less than 5000 in the second step S72, a fifth step S75 is executed.

It is determined whether the engine RPM is higher than 4000 in the fifth step S75. If the engine RPM is higher than 4000, a sixth step S76 is executed. The first variable valve 120 is closed and the second variable valve 130 is opened in the sixth step S76.

If the engine RPM is less than 4000 in the fifth step S75, the seventh step S77 is brought to effect. It is determined whether the engine RPM is higher than a predetermined value of 1400 in the seventh step S77. If the engine RPM is higher than 1400, the eighth step S78 is carried out. The first and second variable valves 120 and 130 are both closed in the eighth step S78.

If the engine RPM is less than 1400 in the seventh step S77, the fourth step S74 can be carried out so as to improve the idling stability of the engine according to various embodiments of the present invention.

The resonance frequency of the intake is varied to improve the performance of the engine by opening or closing the first and second variable valves that are respectively mounted on the plenum and the variable pipe in various embodiments of the present invention. Particularly, the variable pipe is divided into upper and lower portions such that the installation thereof becomes easier in a narrow space.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable intake system, comprising:
   a single plenum that is connected to runners and that has a space formed therein;
   a first barrier that divides the space inside the plenum into a first space and a second space;
   a first variable valve that is mounted on the first barrier to connect or isolate the first space and the second space to/from each other;
   a variable pipe of which one side thereof is connected to the plenum and the other side is closed;
   a second barrier that divides the variable pipe into at least two spaces; and
   a second variable valve that is mounted on the second barrier to connect or isolate the at least two spaces to/from each other.

2. The variable intake system of claim 1, wherein the first barrier and the second barrier are connected to each other.

3. The variable intake system of claim 1, wherein the second variable valve is disposed in an end portion that is a closed part of the variable pipe, the second barrier of the variable pipe is disposed in a length direction of the variable pipe, and the at least two spaces of the variable pipe are disposed in a substantially vertical (or up/down) direction.

4. The variable intake system of claim 1, wherein the first variable valve or the second variable valve are variably opened or closed according to engine rotation speed or the opening amount of a throttle valve.

5. The variable intake system of claim 1, wherein the runners include at least a first runner that is connected to a first bank of an engine and at least a second runner that is connected to a second bank of the engine.

6. A control method of a variable intake system including a single plenum that is connected to runners and that has a space formed therein, a first barrier that divides the plenum into a first space and a second space, a first variable valve that is mounted on the first barrier to connect or isolate the first space and the second space to/from each other, a variable pipe of which one side thereof is connected to the plenum and the other side is closed, a second barrier that divides the variable pipe into at least two spaces, and a second variable valve that is mounted on the second barrier to connect or isolate the at least two spaces to/from each other, the method comprising:
   detecting rotation speed of an engine;
   detecting an opening amount of a throttle valve; and
   controlling an opening amount of the second variable valve according to the rotation speed of the engine and/or the opening amount of the throttle valve.

7. The control method of a variable intake system of claim 6, further comprising controlling the opening amount of the first variable valve according to the rotation speed of the engine and/or the opening amount of the throttle valve.

8. The control method of a variable intake system of claim 7, further comprising closing the first variable valve and the second variable valve at a first predetermined engine speed and opening the first variable valve and the second variable valve at a second predetermined engine speed, wherein the first predetermined engine speed is lower than the second predetermined engine speed.

9. The control method of a variable intake system of claim 7, further comprising:
   opening the first and second variable valves in a case in which the rotation speed of the engine is larger than or equal to a first predetermined value and the opening amount of the throttle valve is larger than or equal to a predetermined opening amount;

closing the first variable valve and opening the second variable valve in a case in which the rotation speed of the engine is less than the first predetermined value and is larger than a second predetermined value; and closing the first and second variable valves in a case in which the rotation speed of the engine is less than the second predetermined value and is larger than or equal to a third predetermined value.

10. The control method of a variable intake system of claim 9, further comprising closing the first and second variable valves in a case in which the rotation speed of the engine is less than a third predetermined value.

11. The control method of a variable intake system of claim 7, further comprising opening the first and second variable valves in a case in which the opening amount of the throttle valve is less than the predetermined opening amount.

* * * * *